United States Patent Office 3,632,818
Patented Jan. 4, 1972

3,632,818
3-AMINO-4-DIHALO PYRAZOLONES
Andre Allais, Les Lilas, and Pierre Girault, Paris, France, assignors to Roussel-UCLAF, Paris, France
No Drawing. Filed Jan. 2, 1969, Ser. No. 788,629
Claims priority, application France, Jan. 4, 1968, 134,865
Int. Cl. C07d 49/06
U.S. Cl. 260—310 A                                  8 Claims

ABSTRACT OF THE DISCLOSURE 3-amino-4,4-dihalo-5-pyrazolones of the formula

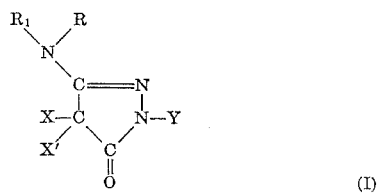

wherein X and X' are selected from the group consisting of chlorine and bromine, Y is selected from the group consisting of alkyl, cycloalkyl and aryl which may be substituted and R and $R_1$ are selected from the group consisting of hydrogen, alkyl, aryl, cycloalkyl and aralkyl which possess fungicidal activity and their preparation.

OBJECTS OF THE INVENTION

It is an object of the invention to provide the novel 3-amino-4,4-dihalo-pyrazolones of Formula I.

It is another object of the invention to provide a novel process for the preparation of the pyrazolones of Formula I.

It is a further object of the invention to provide novel anti-fungal compositions.

It is an additional object of the invention to provide a novel method of combatting fungi.

These and other objects and advantages of the invention will become obvious from the following detailed description.

THE INVENTION

The novel 3-amino-4,4-dihalo-5-pyrazolones of the invention have the formula

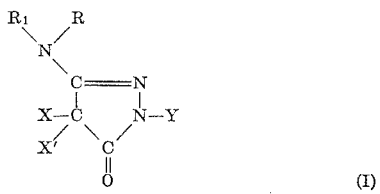

wherein X and X' are selected from the group consisting of chlorine and bromine, Y is selected from the group consisting of alkyl, cycloalkyl and aryl which may be substituted and R and $R_1$ are selected from the group consisting of hydrogen, alkyl, aryl, cycloalkyl and aralkyl.

Preferably Y is alkyl of 1 to 7 carbon atoms, cycloalkyl of 5 to 7 carbon atoms or monocyclic aryl, all of which may be substituted with at least one member of the group consisting of halogen, lower alkyl and lower alkoxy of 1 to 7 carbon atoms, trifluoromethyl, nitro and amino and R and $R_1$ are hydrogen, alkyl of 1 to 7 carbon atoms, cycloalkyl of 5 to 7 carbon atoms, monocyclic aralkyl having 1 to 7 alkyl carbon atoms and monocyclic aryl. Particularly interesting compounds are 1-(4'-chlorophenyl)-3-amino-4,4'-dichloro-5-pyrazolone and 1-(3'-trifluoromethylphenyl)-3-amino-4,4-dichloro-5-pyrazolone.

The novel pyrazolones of Formula I possess a valuable anti-fungal activity which makes them particularly suitable for use in the agricultural field for disinfecting soils and protecting seeds.

The process of the invention for the preparation of the pyrazolones of Formula I comprises condensing a lower alkyl cyanacetate of the formula

wherein Alk is lower alkyl in the presence of a basic agent with a hydrazine of the formula $$Y-NH-NH_2 \qquad (III)$$

wherein Y has the above definition to form a pyrazolone of the formula

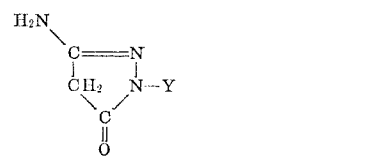

reacting if desired the latter compound with an amine selected from the group consisting of a primary amine and a secondary amine in the presence of an acid agent, and reacting a pyrazolone of the formula

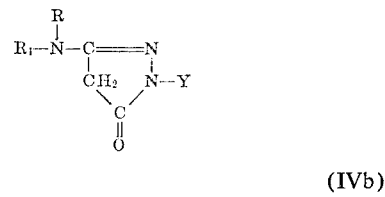

wherein R and $R_1$ have the above definitions with a chlorinating or brominating agent to form the 3-amino-4,4-dihalo-5-pyrazolone of Formula I.

The lower alkyl cyanacetate is preferably methyl or ethyl cyanacetate and the basic agent is preferably an alkali metal alcoholate such as potassium or sodium methylate or ethylate in excess alcohol. The acid agent is preferably an organic acid such as acetic acid or propionic acid. The halogenating agent is preferably chlorine or bromine in an inert organic solvent such as carbon tetrachloride or carbon sulfide.

The fungicidal compositions of the invention are comprised of an effective amount of at least one compound of Formula I and a major amount of an inert agricultural carrier. The compositions may be in the form of emulsions, solutions, suspensions, concentrates, wettable powders, dusts, etc.

The novel method of the invention for controlling fungi comprises contacting the fungi with an effective amount of at least one pyrazolone of Formula I. The compounds are preferably incorporated in the soil or seeds are treated by the said compound.

In the following examples there are described several preferred embodiments to illustrate the invention. However, it should be understood that the invention is not intended to be limited to the specific embodiments.

Example I.—Preparation of 1-phenyl-3-amino-4,4-dichloro-5-pyrazolone

Step A: 1-phenyl-3-amino-5-pyrazolone.—46 g. of sodium were introduced in small amounts into 900 cc. of ethanol and after the solution obtained was cooled, 113 g. of ethyl cyanacetate and 108 g. of phenylhydrazine were added thereto. The mixture was agitated for an hour and then heated at reflux for fifteen hours. Ethanol was eliminated by distillation in vacuo and water was added to the residue. The aqueous phase was washed with ether, acidified by addition of acetic acid and cooled The precipitate thus formed was recovered by suction-filtration, washed and dried to obtain 88 g. of 1-phenyl-3-amino-5-pyrazolone having a melting point of 220–221° C.

Step B: 1-phenyl-3-amino-4,4-dichloro-5-pyrazolone.— 20 g. of 1-phenyl-3-amino-5-pyrazolone was added into 400 cc. of carbon tetrachloride and the suspension was cooled to 0° C. In about 15 minutes, 105 cc. of a solution of 16 g. of chlorine per 100 cc. of carbon tetrachloride was added thereto and the mixture was agitated for 30 minutes at +10° C. The precipitate thus formed was vacuum filtered, washed and dried to obtain 24 g. of 1-phenyl-3-amino-4,4-dichloro-5-pyrazolone having a melting point of 147–148° C.

A sample of the product was purified by crystallization from isopropyl ether and had a melting point of 148–149° C.

Analysis.—$C_9H_7Cl_2N_3O$; molecular weight=244.1. Calculated (percent): C, 44.28; H, 2.89; Cl, 29.05; N, 17.21. Found (percent): C, 44.4; H, 3.2; Cl, 29.2; N, 17.0.

As far as is known, this compound is not described in the literature.

Example II.—Preparation of 1-(4'-chlorophenyl)-3-amino-4,4-dichloro-5-pyrazolone Step A: 1-(4'-chlorophenyl)-3-amino-5-pyrazolone.— 16.5 g. of sodium were added in small amounts to 450 cc. of ethanol under an atmosphere of nitrogen. When dissolution of the sodium was complete, the reaction mixture was cooled to ambient temperature and 43 g. of ethyl cyanacetate and 51 g. of 4-chlorophenylhydrazine were added thereto. The reaction mixture was stirred for one hour at ambient temperature and then for fifteen hours at reflux. After cooling the reaction mixture, it was concentrated to dryness under reduced pressure. Water was added to the residue and the aqueous solution was washed with ether, acidified with acetic acid and cooled. The precipitate was recovered by suction-filtration and was washed with water and dried to obtain 40 g. of 1-(4'-chlorophenyl)-3-amino-5-pyrazolone having a melting point of 173–174° C.

A sample of this product upon crystallization had a melting point of 173–174° C.

Analysis.—$C_9H_8ClN_3O$; molecular weight=209.6. Calculated (percent): C, 51.56; H, 3.84; Cl, 16.91; N, 20.05. Found (percent): C, 51.7; H, 4.1; Cl, 16.7; N, 19.7.

Step B: 1-(4'-chlorophenyl)-3-amino-4,4-dichloro-5-pyrazolone.—21 g. of 1-(4'-chlorophenyl)-3-amino-5-pyrazolone were added to 400 cc. of carbon tetrachloride and the reaction mixture was cooled to 0° C. Over about 15 minutes, 85 cc. of a solution of 18 g. of chlorine in 100 cc. of carbon tetrachloride was added thereto and the mixture was agitated for 30 minutes at 20° C. The precipitate was vacuum filtered, washed with carbon tetrachloride and dried to obtain 24 g. of 1-(4'-chlorophenyl)-3-amino-4,4-dichloro-5-pyrazolone with a melting point of 158–159° C.

A sample of this product upon crystallization from methanol had an unchanged melting point.

Analysis.—$C_9H_6Cl_3N_3O$, molecular weight=278.5. Calculated (percent): C, 38.81; H, 2.17; Cl, 38.19; N, 15.09. Found (percent): C, 38.8; H, 2.3; Cl, 37.9; N, 15.1.

As far as is known, this compound is not described in the literature.

Example II.—Preparation of 1-(3',4'-dichlorophenyl)-3-amino-4,4-dichloro-5-pyrazolone Step A: 1-(3',4'-dichlorophenyl)-3-amino-5-pyrazolone.—In a manner analogous to that of Example I, 3,4-dichlorophenylhydrazine and ethyl cyanacetate were condensed to obtain 1-(3',4'-dichlorophenyl)-3-amino-5-pyrazolone with a melting point of 239–240° C.

Analysis.—$C_9H_7Cl_2N_3O$; molecular weight=244.1. Calculated (percent): C, 44.28; H, 2.90; Cl, 29.05; N, 17.21. Found (percent): C, 44.5; H, 3.3; Cl, 28.9; N, 17.2.

As far as is known, this compound is not described in the literature.

Step B: 1-(3',4'-dichlorophenyl)-3-amino-4,4-dichloro-5-pyrazolone.—In a manner analogous to that of Example I, chlorine in solution in carbon tetrachloride was reacted with 1-(3',4'-dichlorophenyl)-3-amino-5-pyrazolone to obtain 1-(3',4'-dichlorophenyl)-3-amino-4,4-dichloro-5-pyrazolone with a melting point of 129–130° C.

Analysis.—$C_9H_5Cl_4N_3O$; molecular weight=313.0. Calculated (percent): C, 34.53; H, 1.61; Cl, 45.32; N, 13.42. Found (percent): C, 34.5; H, 1.7; Cl, 45.0; N, 13.2.

As far as is known, this compound is not described in the literature.

Example IV.—Preparation of 1-(4'-methoxyphenyl)-3-amino-4,4-dichloro-5-pyrazolone Step A: 1-(4'-methoxyphenyl)-3-amino-5-pyrazolone.— In a manner analogous to that of Example I, 4-methoxyphenylhydrazine was condensed with ethyl cyanacetate to obtain 1-(4'-methoxyphenyl)-3-amino-5-pyrazolone with a melting point of 189–190° C.

Step B: 1-(4'-methoxyphenyl)-3-amino-4,4-dichloro-5-pyrazolone.—In a manner analogous to that of Example I, 1-(4'-methoxyphenyl)-3-amino-5-pyrazolone was chlorinated to obtain 1-(4'-methoxyphenyl)-3-amino-4,4-dichloro-5-pyrazolone with a melting point of 170–171° C.

Analysis.—$C_{10}H_9Cl_2N_3O_2$; molecular weight=274.1. Calculated (percent): C, 43.81; H, 3.31; Cl, 25.87; N, 15.33. Found (percent): C, 43.9; H, 3.7; Cl, 25.7; N, 15.2.

As far as is known, this compound is not described in the literature.

Example V.—Preparation of 1-(3'-chloro-4'-methoxyphenyl)-3-amino-4,4-dichloro-5-pyrazolone Step A: 1-(3'-chloro-4'-methoxyphenyl)-3-amino-5-pyrazolone.—In a manner analogous to that of Example I, 3-chloro-4-methoxyphenylhydrazine was condensed with ethyl cyanacetate to obtain 1-(3'-chloro-4'-methoxy-phenyl)-3-amino-5-pyrazolone having a melting point of 229–230° C.

Analysis.—$C_{10}H_{10}ClN_3O_2$; molecular weight=239.6. Calculated (percent): C, 50.12; H, 4.20; Cl, 14.79; N, 17.54. Found (percent): 50.4; H, 4.4; Cl, 14.9; N, 17.6.

As far as is known, this compound is not described in the literature.

Step B: 1-(3'-chloro-4'-methoxyphenyl)-3-amino-4,4-dichloro-5-pyrazolone.—In a manner analogous to that of Example I, 1-(3'-chloro-4'-methoxyphenyl)-3-amino-5-pyrazolone was chlorinated to form 1-(3'-chloro-4'-methoxyphenyl)-3-amino-4,4-dichloro-5-pyrazolone with a melting point of 202–203° C.

Analysis.—$C_{10}H_8Cl_3N_3O_2$; molecular weight=308.5. Calculated (percent): C, 38.93; H, 2.61; Cl, 34.48; N, 13.62. Found (percent): C, 38.8; H, 2.7; Cl, 34.6; N, 13.9.

As far as is known, this compound is not described in the literature.

The starting product, 3-chloro-4-methoxyphenyl-hydrazine, was prepared as follows:

(a) Diazotation.—20 g. of 3-chloro-4-methoxyaniline were introduced into 150 cc. of aqueous solution of 22 Bé. hydrochloric acid and the reaction mixture was heated to 70° C. After cooling to 0° C., a solution of 17 g. of sodium nitrite in 200 cc. of water was added thereto in about 30 minutes and the mixture was stirred one hour at 0° C.

(b) Reduction.—Into the reaction mixture obtained above, 56 g. of dihydrated stannous chloride in solution in 50 cc. of aqueous solution of 22° Bé. hydrochloric acid were introduced and the mixture was stirred for two hours at 0° C. The precipitate thus formed was recovered by filtration.

(c) 3 - chloro - 4-methoxyphenyl-hydrazine-hydrochloride.—The crude product obtained in (b) was introduced over about 30 minutes at 0° C. into 200 cc. of 4.15 N aqueous solution of potassium hydroxide. The mixture was agitated at 0° C. for thirty minutes. The precipitate thus formed was recovered by vacuum filtration, was washed with water, dried and added to 300 cc. of ethanol. The solution thus obtained was cooled to 0° C. and hydrochloric gas was bubbled into it until precipitation stopped. The precipitate thus formed was recovered by vacuum filtration and was washed with ether and dried to obtain 15 g. of the hydrochloride of 3-chloro-4-methoxyphenylhydrazine having a melting point of 250° C.

(d) Obtaining 3 - chloro-4-methoxyphenylhydrazine.—The 15 g. of hydrochloride obtained in (c) was added to 450 cc. of water. The solution was made alkaline with sodium hydroxide and was extracted with ether. The ethereal extracts were washed with water, dried and concentrated to dryness under reduced pressure to obtain 9 g. of 3 - chloro - 4 - methoxyphenylhydrazine with a melting point of 68° C., which was used preferably without delay, to avoid a possible alteration.

As far as is known, the hydrochloride of 3-chloro-4-methoxyphenylhydrazine, and 3-chloro-4-methoxyphenylhydrazine, are not described in the literature.

Example VI.—Preparation of 1-phenyl-3-methylamino-4,4-dichloro-5-pyrazolone

Step A: 1 - phenyl - 3-methylamino-5-pyrazolone.—400 cc. of acetic acid were introduced in about an hour at −50° C. into 100 g. of methylamine and after raising the temperature of the reaction mixture to 20° C., 60 g. of 1-phenyl-3-amino-5-pyrazolone were added thereto and the reaction mixture was heated to reflux which was maintained for fourteen hours. After cooling the reaction mixture was poured into water, the insoluble matter formed was eliminated by filtration. The filtrate was adjusted to pH of 7 by adding thereto an aqueous solution of sodium bicarbonate. The aqueous phase was extracted with methylene chloride and the methylene chloride extracts were washed with water, dried and concentrated to dryness. The residue was dissolved in methanol, the precipitate thus formed was vacuum filtered to obtain 20 g. of 1-phenyl-3-methylamino-5-pyrazolone with a melting point of 164–165° C. A sample of this product upon recrystallization from methanol had a melting point of 166–167° C.

Analysis.—$C_{10}H_{11}N_3O$; molecular weight=189.2. Calculated (percent): C, 63.47; H, 5.86; N, 22.21. Found (percent): C, 63.8; H, 6.0; N, 22.1.

Stage C: 1-phenyl-3-methylamino-4,4-dichloro-5-pyrazolone.—20 g. of 1 - phenyl - 3-methylamino-5-pyrazolone were dissolved in 350 cc. of chloroform and the solution obtained was cooled to 0° C. At this temperature over about 20 minutes, 100 cc. of solution of 15 g. of chlorine in 100 cc. of carbon tetrachloride was added. The mixture was agitated at 0° C. for thirty minutes, then concentrated to a small volume under reduced pressure. After cooling, the precipitate thus formed was vacuum filtered, washed and dried to obtain 23 g. of 1-phenyl-3-methylamino-4,4-dichloro-5-pyrazolone with a melting point of 141–142° C. A sample of this product upon recrystallization from isopropyl ether had a melting point of 141–142° C.

Analysis.—$C_{10}H_9Cl_2N_3O$; molecular weight=258.1. Calculated (percent): C, 46.53; H, 3.52; Cl, 27.47; N, 16.28. Found (percent): C, 46.4; H, 3.7; Cl, 27.2; N, 16.1.

As far as is known, this compound is not described in the literature.

Example VII.—Preparation of 1-phenyl-3-dimethylamino-4,4-dichloro-5-pyrazolone

In a manner analogous to that of Example VI, 1-phenyl-3-amino-5-pyrazolone was condensed in an acetic acid medium with dimethylamine to obtain 1-phenyl-3-dimethylaminopyrazolone having a melting point of 139–140° C. The chlorination of this compound gave 1-phenyl-3-dimethylamino-4,4-dichloro-5-pyrazolone melting at 94–95° C.

Analysis.—$C_{11}H_{11}Cl_2N_3O$; molecular weight=272.1. Calculated (percent): C, 48.55; H, 4.07; Cl, 26.06; N, 15.45. Found (percent): C, 48.8; H, 4.1; Cl, 26.1; N, 15.1.

As far as is known, 1-phenyl-3-dimethylamino-4,4-dichloro-5-pyrazolone is not described in the literature.

Example VIII.—Preparation of 1-phenyl-3-benzylamino-4,4-dichloro-5-pyrazolone

In a manner analogous to that of Example VI, 1-phenyl-3-amino-5-pyrazolone was condensed in an acetic acid medium with benzylamine to obtain 1-phenyl-3-benzylamino-5-pyrazolone melting at 132–133° C. The chlorination of this compound gave 1-phenyl-3-benzylamino-4,4-dichloro-5-pyrazolone melting at 183–184° C.

Analysis.—$C_{16}H_{13}Cl_2N_3O$; molecular weight=334.2. Calculated (percent): C, 57.49; H, 3.92; Cl, 21.22; N, 12.57. Found (percent): C, 57.5; H, 4.1; Cl, 21.0; N, 12.7.

As far as is known, this compound is not described in the literature.

Example IX.—Preparation of 1-(3′-trifluoromethylphenyl)-3-amino-4,4-dichloro-5-pyrazolone 19 g. of 1-(3′-trifluoromethylphenyl) - 3 - amino-5-pyrazolone were added to 250 cc. of chloroform and the reaction suspension was cooled to 0° C. Over a few minutes, a solution of 11 g. of chlorine in 100 cc. of carbon tetrachloride was added thereto and agitated for one hour at 0° C. The solvent was eliminated by distillation under reduced pressure and to the residue was added 50 cc. of isopropyl ether and 50 cc. of petroleum ether (B.P. 60–80° C.). The solution was cooled to 0° and the precipitate thus formed was filtered and dried to obtain 19 g. of 1-(3′-trifluoromethylphenyl)-3-amino - 4,4 - dichloro-5-pyrazolone, melting at 100° C. A sample of this product was recrystallized from a mixture of isopropyl ether and petroleum ether (B.P. 60–80° C.).

Analysis.—$C_{10}H_6Cl_2F_3N_3O$; molecular weight=312.078. Calculated (percent): C, 38.48; H, 1.93; Cl, 22.75; F, 18.26; N, 13.46. Found (percent): C, 38.6; H, 2.3; Cl, 22.4; F, 18.4; N, 13.6.

As far as is known, this compound is not described in the literature.

1-(3′-trifluoromethylphenyl) - 3 - amino-5-pyrazolone can be prepared as follows:

13.8 g. of sodium cut into fragments were added to 600 cc. of ethanol and the mixture was agitated until total dissolution occurred. The temperature of the reaction mixture was raised to 20° C. and over a few minutes 34 g. of ethyl cyanacetate, then 53 g. of meta-trifluoromethylphenylhydrazine (obtained according to the process of E. J. Forbes et al., Tetrahedron, vol. 8, p. 67 (1960)) were added thereto. The reaction mixture was heated to reflux and maintained there for 16 hours. The ethanol was eliminated by distillation under reduced pressure and the residue was admixed with water. The solution thus obtained was extracted with ethyl ether. The aqueous phase was made acidic with acetic acid. The precipitate thus formed was vacuum filtered, washed with water and dried. The product thus obtained was dissolved in ethyl ether and the ethereal solution was extracted with an N aqueous solution of hydrochloric acid, then with water, dried and concentrated to dryness by distillation under reduced pressure. The residue was dissolved in isoproppl ether, which was cooled. The precipitate thus formed was vacuum-filtered, and dried to obtain 19 g. of 1-(3′-trifluoromethylphenyl)-3-amino-5-pyrazolone, melting at 159° C. A sample of this product upon crystallization from ethanol melted at 160° C.

Analysis.—$C_{10}H_8F_3N_3O$; molecular weight=243.18. Calculated (percent): C, 49.38; H, 3.31; F, 23.44; N, 17.28. Found (percent): C, 49.6; H, 3.5; F, 23.3; N, 17.4.

As far as is known, this compound is not described in the literature.

Example X.—Fungicidal activity of 1-(4'-chlorophenyl)-3-amino-4,4-dichloro-5-pyrazolone (compound A)

(A) Activity on *Fusarium roseum* on wheat).—The effectiveness of compound A was studied on seeds of wheat contaminated with spores of *Fusarium roseum* and then treated.

Contamination of the "Champlain" wheat was effected by steeping the seeds in a suspension of spores of *Fusarium roseum* adjusted to 100,000 spores per cc. and then the seeds were dried for 24 hours in the ambient air. The seeds were then treated with a quantity of compound A corresponding to 80 g./quintal. The sowing was effected on dishes of sand. There were 5 plots of 100 grains each. After 4 weeks' storage at 20° C., the number of healthy, diseased and dead plants were ascertained.

The results are given in percentage effectiveness, taking account of parallel tests with a non-treated control. In these conditions at the dose of 80g./quintal, the percentage effectiveness observed was 61%.

(B) Activity on *Rhizoctonia solani*.— The effectiveness of compound A was determined by sowing test-plants in contaminated soil then treated. A mixture consisting of ⅓ earth ⅓ sand and ⅓ Polish peat was used as soil and 1 volume of culture of *Rhizoctonia solani* (on bran and vermiculite enriched with Knopp liquid) was added to 29 volumes of soil. The treatments were effected by direct incorporation of compound A in the soil at doses of 500 and 250 p.p.m. of active material and then the soil was left at rest for three weeks. The test plant used was *Phaseolus aureus* Mungo and the treated soil was distributed into the pots containing the test plant; there were 5 pots, each containing 10 test-plants, per concentration.

After 12 days' storage at 20° C., the healthy plants were counted and the results were expressed in percentage of effectiveness taking account of a non-treated control plant. In these conditions the percentage of effectiveness for compound A was 87% at the concentration of 500 p.p.m. and 31% at the concentration of 250 p.p.m.

Various modifications of the compositions and method of the invention may be made without departing from the spirit or scope thereof.

We claim:

1. 1-(4'-chlorophenyl) - 3 - amino - 4,4 - dichloro-5-pyrazolone.
2. 1-(3',4'-dichlorophenyl) - 3 - amino-4,4-dichloro-5-pyrazolone.
3. 1-(4'-methoxyphenyl) - 3 - amino - 4,4 - dichloro-5-pyrazolone.
4. 1-(3'-chloro-4'-methoxyphenyl) - 3 - amino-4,4-dichloro-5-pyrazolone.
5. 1-phenyl-3-methylamino-4,4-dichloro-5-pyrazolone.
6. 1-phenyl-3-dimethylamino-4,4-dichloro-5-pyrazolone.
7. 1-phenyl-3-benzylamino-4,4-dichloro-5-pyrazolone.
8. 1 - (3' - trifluoromethylphenyl) - 3 - amino-4,4-dichloro-5-pyrazolone.

References Cited

UNITED STATES PATENTS

| | | | |
|---|---|---|---|
| 2,899,443 | 8/1959 | Schulze | 260—310 |
| 3,006,759 | 10/1961 | Loria et al. | 260—310 |

FOREIGN PATENTS

| | | | |
|---|---|---|---|
| 1,069,534 | 5/1967 | Great Britain | 260—310 |

OTHER REFERENCES

Elderfield: Heterocyclic Compounds, vol. 5, p. 151, N.Y. Wiley, 1957.

Gagnon et al.: Canadian J. Res., vol. 27-B, pp. 190–204 (1949)

Hull: J. Chem. Soc. (London), 1967, Sec. C., pp. 1154–5.

Netherlands application 6707544, November 1967 (21 pages spec.).

Weissberger et al.: J. Amer. Chem. Soc., vol. 64, pp. 2133–6 (1942).

Weissberger et al.: J. Amer. Chem. Soc., vol. 66, pp. 1849–51 (1944).

Westöö: Acta Chem. Scand., vol. 6, Pt. 2, pp. 1499–1515 (1952).

Wiley et al.: Pyrazolones, Pyrazolidines, and Derivatives (vol. 20–The Chemistry of Heterocyclic Compounds. Weissberger, ed.) pp. 81–3 and 344–5, N.Y. Interscience, Wiley, 1964.

NATALIE TROUSOF, Primary Examiner

U.S. Cl. X.R.

260—569; 424—273